United States Patent [19]

Streit et al.

[11] Patent Number: 4,474,916
[45] Date of Patent: Oct. 2, 1984

[54] CONCENTRATED AQUEOUS SOLUTIONS OF MIXTURES OF ORGANIC COMPLEXING AGENTS AND DISPERSING AGENTS BASED ON POLYMERIC ALIPHATIC CARBOXYLIC ACIDS

[75] Inventors: Werner Streit, Bobenheim; Wolfram Bergold, Heidelberg; Dieter Bassing, Ludwigshafen, all of Fed. Rep. of Germany

[73] Assignee: BASF Aktiengesellschaft, Ludwigshafen, Fed. Rep. of Germany

[21] Appl. No.: 515,809

[22] Filed: Jul. 21, 1983

[51] Int. Cl.$^3$ ............................................... C08K 5/16
[52] U.S. Cl. .................................... 524/130; 524/238; 524/239; 524/556; 525/329.8; 525/329.9
[58] Field of Search ............... 524/130, 238, 239, 556; 525/329.8, 329.9

[56] References Cited

U.S. PATENT DOCUMENTS

| 3,711,323 | 1/1973 | Heap et al. | 524/556 |
| 4,303,568 | 12/1981 | May et al. | 524/130 |
| 4,384,064 | 5/1983 | Trotter et al. | 524/239 |

Primary Examiner—Paul R. Michl
Assistant Examiner—A. H. Walker
Attorney, Agent, or Firm—Joseph D. Michaels

[57] ABSTRACT

Aqueous solutions comprising 25 to 60 percent by weight of mixtures of
(a) polymers of acrylic acid and/or copolymers of acrylic acid with maleic acid and
(b) aminopolycarboxylic acids, aminopolyphosphonic acids and/or hydroxyalkanepolyphosphonic acids,
such solutions having a pH value of about 3 to about 7 with the acid groups being present 20 to 80 percent in the form of the potassium salts and the remaining acid groups being present in form of the free acid, the amine salt, or mixtures thereof.

2 Claims, No Drawings

CONCENTRATED AQUEOUS SOLUTIONS OF MIXTURES OF ORGANIC COMPLEXING AGENTS AND DISPERSING AGENTS BASED ON POLYMERIC ALIPHATIC CARBOXYLIC ACIDS

BACKGROUND OF THE INVENTION

1. Field of the Invention

This invention relates to the art of dyeing of cellulose-containing textiles. Specifically, it relates to concentrated aqueous solutions containing both dispersants and sequestrants which are used in pretreatment and dyeing to prevent precipitate formation.

2. Description of the Prior Art

For the pretreatment and dyeing of textiles consisting of cellulose or containing cellulose, two types of agents are used to prevent solids precipitation. Complex builders such as amino carboxylic acids, the structurally analogous phosphonic acids, as well as hydroxyalkane polyphosphonic acids are used as sequestrants for alkaline earth and heavy metals (compare European Pat. No. 718,981). With these metal ions, these complex builders produce soluble complexes so that precipitation is prevented. They, furthermore, have the ability to redissolve already existing precipitates.

The second type agent is exemplified by polymers or copolymers of acrylic acid which are used as dispersants for difficult to dissolve components such as, for example, calcium pectinates, which occur during boiling and bucking processes as well as in dyeing liquors. (Compare, for example, German application No. 29 26 098). These complexing and dispersing agents were previously each used in the form of approximately 25 to 60 percent solutions of their sodium salts. Free acid components (as a result of incomplete neutralization) could be present.

As part of the rationalization process, it would be advantageous to mix the two agents together as a single concentrated solution thus achieving simple and convenient metering. However, it is not possible to dissolve mixtures of the sodium salts in water together in the desired cncentration since these components "salt each other out" at these concentrations. Solutions with concentrations of up to 10 percent are stable. A combined solution at this concentration is not possible either when the free acids are used.

The purpose of this invention was a combined liquid packaging of above-mentioned complexing and dispersing agents in an aqueous solution with as high a concentration as possible.

SUMMARY OF THE INVENTION

We have found that stable concentrated solutions can be prepared when at least 20 percent of the acid groups are present in form of their potassium salts. Such potassium derivatives can enter into solution up to 60 percent and do not precipitate when separate solutions of the individual components are mixed. They have a combined synergistic effect especially as far as the calcium bonding capacity is concerned.

Specifically, this invention is an aqueous solution having a pH of about 3 to about 7 and a 25 to about 60 weight percent concentration of a mixture comprising (a) a polymer of acrylic acid containing 0 to about 50 weight percent copolymerized maleic anhydride and having a K-value of about 10 to about 25 and (b) amine-containing polybasic acids selected from the group consisting of
  (1) aminopolycarboxylic acid
  (2) aminopolyphosphonic acid
  (3) hydroxyalkanepolyphosphonic acid
  (4) mixtures of (1), (2), and (3)

wherein the acid groups are 20 to 100 percent in the form of potassium salts and those acid groups not so neutralized are present in form selected from the group consisting of
  (i) free acid
  (ii) amine salt
  (iii) mixture of (i) and (ii).

This finding is surprising since the potassium salts of the polymeric carboxylic acids as well as those of the mentioned complex builders are only slightly more water soluble than the corresponding sodium salts. Further, we have noted that potassium salts of the nitrilotriacidic acid salt out other polymeric surfactants such as alkylphenylethoxylates to a significantly higher degree than the sodium salts.

DESCRIPTION OF THE PREFERRED EMBODIMENTS

Complex builders in the sense of this invention are aminopolycarboxylic acids such as nitrilotriacetic acid (NTA), ethylenediaminetetracetic acid (EDTA), diethylenetriaminepentacetic acid or hydroxyethylethylenediaminetriacetic acid (HEDTA) as well as phosphonic acids such as ethylenediaminetetramethylene phosphonic acid or hydroxyethanediphoshonic acid.

The dispersants used in this invention are polymers of acrylic acid having K-values according to Fikentscher of approximately 10 to 25. If the materials are copolymers with maleic acid, the latter is polymerized into the product up to 50 percent by weight.

According to this invention, the complex builder and polymer acid are used at a weight ratio of from 7:1 to 1:7, preferably 2:1 to 1:2, and water is used in such an amount that the resultant solution contains 25 to 60 percent solids.

The invention will be described in greater detail in the following Examples. Parts referred to in the Examples are parts by weight.

Procedure for Preparation of Product

The general procedure for preparing the stable, concentrated aqueous solutions of this invention is to blend the complex builder and polymer acid (in the free acid form) in the desired weight ratio and to add the amount of water calculated to give a solution of the desired concentration.

This initially produces a suspension to which KOH or potash is added while the suspension is agitated and cooled in such an amount that the components are neutralized to an extent of at least 20, preferably 40 to 70 percent, that is, that the components are present in the form of their potassium salts. The lower limit corresponds with a pH value of about 3. In most cases, the mixture is neutralized to a pH value of approximately 4.5 to 6.

Compositions of this invention are given in Examples 1, 2, 3, 4, 5, 6 and 7 in Table I.

Test Procedures

The dispersing effect of the mixtures was tested by determining the calcium bonding capacity until flocculation occurred in the solutions.

The complexing effect was determined via the solution capacity with respect to CaCO₃. For this purpose, 150 mg of CaCO₃ were suspended in 1 percent sodium hydroxide solution. The mixture was subsequently heated to 85° C. and 1 gram of the substance to be tested was added. After 30 minutes, the hot suspension was filtered, the residue was dissolved in formic acid and was again quantitatively determined using a solution of the disodium salt of EDTA and a buffer tablet as indicator.

The results are shown in the Table II below. In addition to the products of Examples 1–7, values for typical starting materials are given.

TABLE I

| Starting Material (pts) | Examples: | | | | | | |
|---|---|---|---|---|---|---|---|
| | 1 | 2 | 3 | 4 | 5 | 6 | 7 |
| PAC-50% (1) | 38.0 | 38.0 | 23.0 | — | — | — | 39.4 |
| PAC-100% (2) | — | — | — | 19.0 | 20.0 | — | — |
| PAC-MA (80:20)-60% (3) | — | — | — | — | — | 53.5 | — |
| NTA (4) | 19.2 | — | — | 20.0 | — | — | 12.0 |
| EDTA (5) | — | 19.2 | 11.5 | — | 19.5 | 17.8 | — |
| HEDPA (6) | — | — | — | — | 3.2 | — | 4.0 |
| TEOA (7) | — | — | 11.5 | — | — | — | — |
| KOH | 13.8 | 13.8 | 7.5 | 19.0 | 12.5 | 11.2 | 29.6 |
| Water | 29.0 | 29.0 | 46.0 | 42.0 | 39.0 | 17.5 | 15.5 |
| Solution Properties: | | | | | | | |
| Solids Content | 48.8 | 48.8 | 39.1 | 50.0 | 53.8 | 47.0 | 55.0 |

TABLE I-continued

| | Examples: | | | | | | |
|---|---|---|---|---|---|---|---|
| | 1 | 2 | 3 | 4 | 5 | 6 | 7 |
| pH | 3.6 | 5.2 | 5.0 | 5.0 | — | 5.9 | 6.1 |

(1) Polyacrylic acid-50% active due to contained water of hydration, K-value of 10 to 13
(2) Same as (1) except 100% active
(3) Copolymer of 80% acrylic acid and 20% maleic anhydride, K-value of 20 to 25
(4) Nitrilotriacetic acid
(5) Ethylenediamine tetra-acetic acid
(6) Hydroxyethane diphosphonic acid
(7) Triethanolamine

TABLE II

| Calcium Bonding Capacity in mg CaCO₃/gram of Product at pH value of 11 | Product | Dissolving Capacity for CaCO₃ in mg/g of Product in 1.0 Percent NaOH Solution |
|---|---|---|
| 725 | Example 1 | 67 |
| 680 | Exaxple 2 | 70 |
| 375 | Example 3 | 32 |
| 290 | Example 4 | 65 |
| 310 | Example 5 | 75 |
| 190 | Example 6 | 55 |
| 1050 | Example 7 | 50 |
| 150 | NTA 40% | 80 |
| 125 | EDTA 40% | 102 |
| 225 | Polyacrylic acid (K-value 15–25) 35% | 5 |
| 1100 | Polyacrylic acid (K-value 10–13) 50% | 3 |

The embodiments of the invention in which an exclusive privilege or property is claimed are defined as follows:

1. An aqueous solution having a pH of about 3 to about 7 and a 25 to about 60 weight percent concentration of a mixture comprising
   (a) a polymer of acrylic acid containing 0 to about 50 weight percent copolymerized maleic anhydride and having a K-value of about 10 to about 25 and
   (b) amine-containing polybasic acids selected from the group consisting of
       (1) aminopolycarboxylic acid
       (2) aminopolyphosphonic acid
       (3) hydroxyalkanepolyphosphonic acid
       (4) mixtures of (1), (2), and (3)
wherein the acid groups are 20 to 100 percent in the form of potassium salts and those acid groups not so neutralized are present in a form selected from the group consisting of
   (i) free acid
   (ii) amine salt
   (iii) mixture of (i) and (ii).

2. The composition of claim 1 wherein components (a) and (b) are present in a weight ratio from about 7:1 to about 1:7 and component (b) is selected from the group consisting of
   (a) nitrilotriacetic acid
   (b) ethylenediamine tetra-acetic acid
   (c) hydroxyethanediphosphonic acid
   (d) mixtures of (a), (b), and (c).

* * * * *

UNITED STATES PATENT AND TRADEMARK OFFICE
CERTIFICATE OF CORRECTION

PATENT NO. : 4,474,916

DATED : October 2, 1984

INVENTOR(S) : Werner Streit, Wolfram Bergold, Dieter Bassing

It is certified that error appears in the above-identified patent and that said Letters Patent is hereby corrected as shown below:

First page, Bibliographic Data, add Code 30 -
Foreign Application Priority Data - July 27, 1982
(DE) Fed. Rep. of Germany - 3227915.

Signed and Sealed this

Twenty-third Day of April 1985

[SEAL]

Attest:

DONALD J. QUIGG

Attesting Officer   Acting Commissioner of Patents and Trademarks